Figure 1:
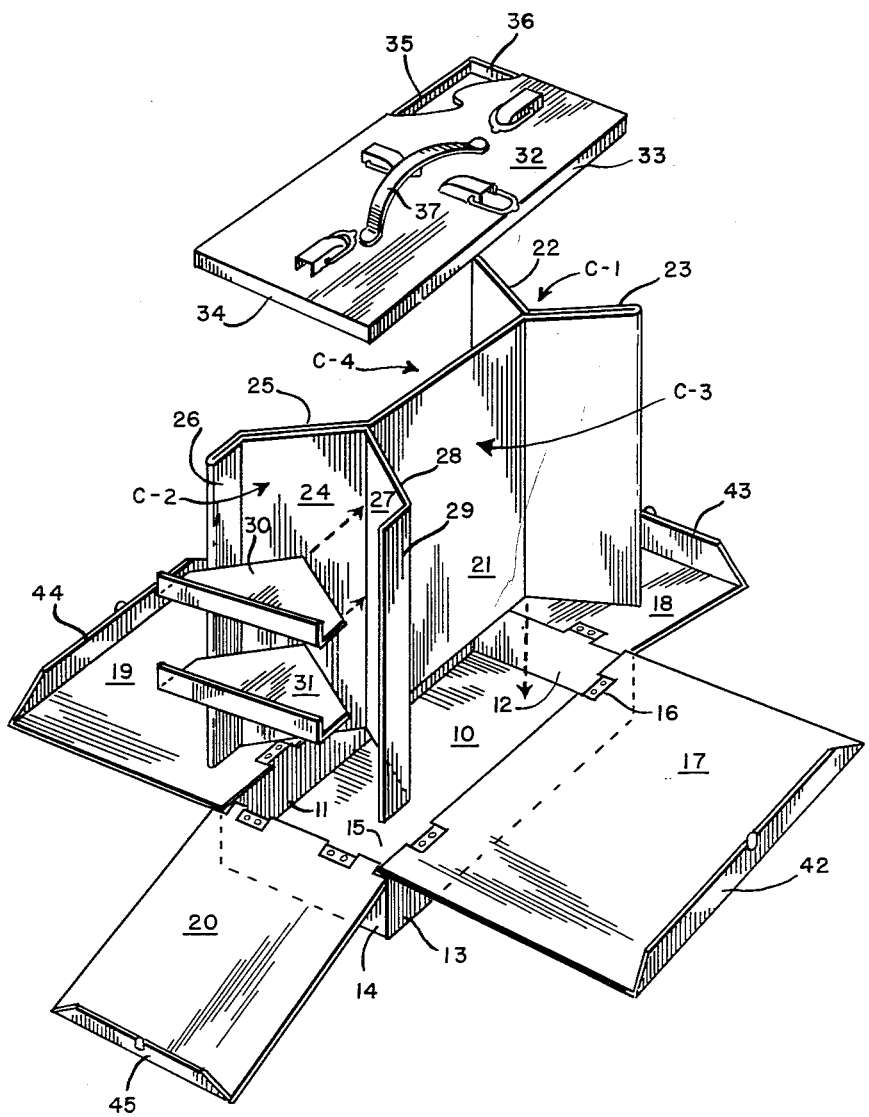

INVENTOR.
HORACE C POWELL

June 13, 1961  H. C. POWELL  2,987,846
FISHING TACKLE CARRIER
Filed March 23, 1959  3 Sheets-Sheet 2

INVENTOR.
HORACE C POWELL
BY
B. B. Olive
ATTORNEY

June 13, 1961
H. C. POWELL
2,987,846
FISHING TACKLE CARRIER
Filed March 23, 1959
3 Sheets-Sheet 3
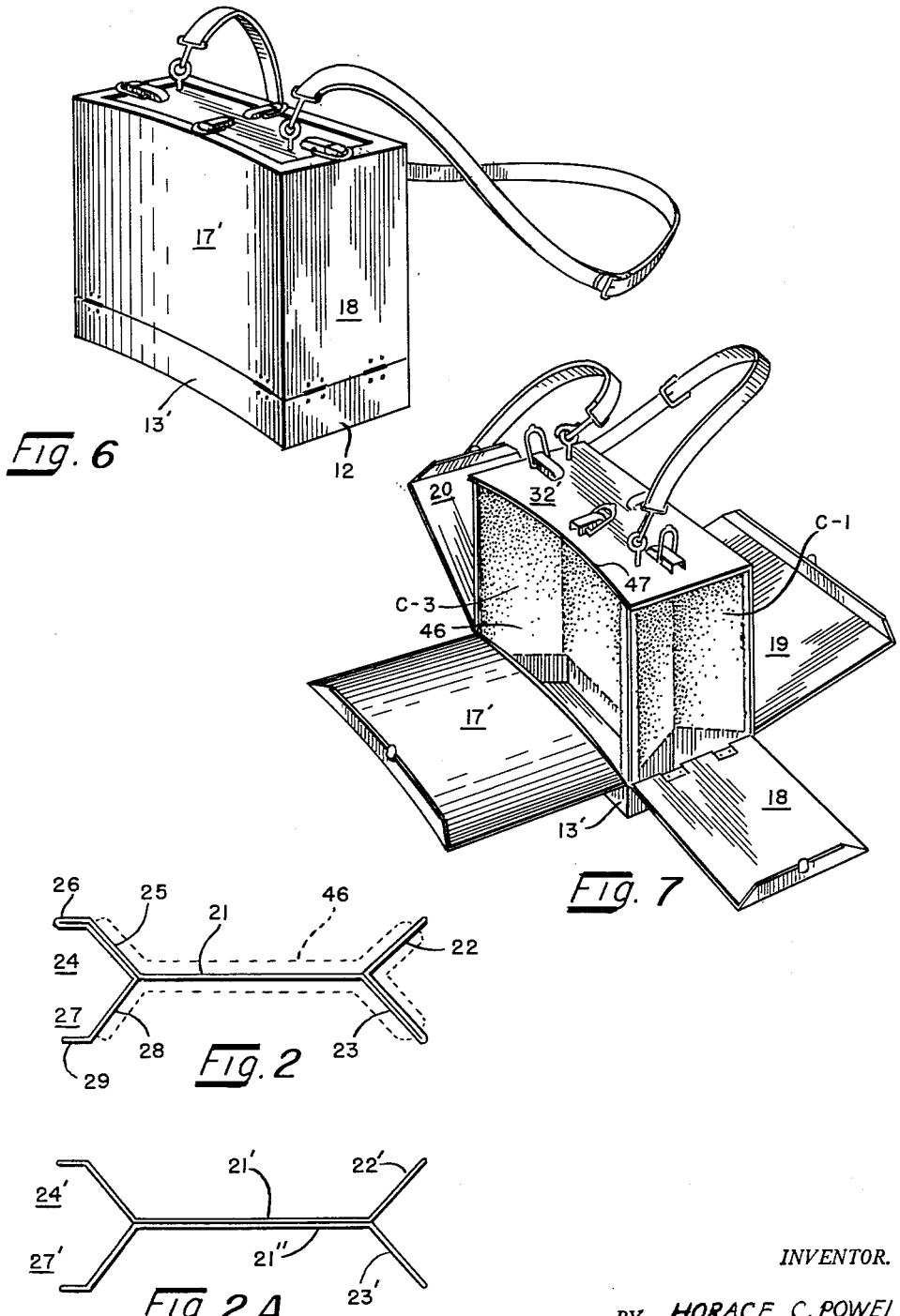
INVENTOR.
BY HORACE C. POWELL
B. B. Olive
ATTORNEY

2,987,846
FISHING TACKLE CARRIER
Horace C. Powell, Rte. 2, Fuquay Springs, N.C.
Filed Mar. 23, 1959, Ser. No. 801,098
2 Claims. (Cl. 43—57.5)

My invention relates to the sport of fishing and is concerned with a box or carrier for transporting and making readily accessible when needed small items of fishing tackle such as lures, flies, hooks, corks, weights, small tools and the like.

In what is, perhaps, the most popular type of fishing tackle carrier, the fisherman employs a box very similar to a mechanic's box for small tools. Within such a carrier, there is usually provided a set of horizontally placed trays, either hinged or removable, having small sections in which the various articles such as lures, flies, hooks and the like are placed. While such carriers are generally satisfactory for transporting and keeping separate uniform sized articles such as weights and corks, they have not been completely satisfactory in respect to keeping separate items such as lures and flies having hooks or leaders attached thereto, since the leaders or hooks attached to one item are apt to become entangled with leaders or hooks attached to another item stored in the same or in an adjacent section of the tray. Furthermore, in the tool box type of carrier, all items must be removed and stored through opening and closing the same cover, which usually constitutes the top of the carrier and, in general, it is sometimes only the uppermost trays and the items stored therein that are exposed for quick inspection and selection by the fisherman.

Fly cases, spooner books and the like have been used in which special storage means have been provided for items such as lures having attached hooks and leaders. Since these cases or books are apt to be carried in any of several positions, such special storage means usually provide for the hooks to be anchored in a strip of material such as cork, and the leaders to be held by attachment to a separate point, a common practice being to place the ends of the leaders between the coils of a spring. Such cases and books do not, ordinarily, provide storage for uniform sized items such as weights, corks and the like and, therefore, such uniform sized items must be carried in a separate box or carrier such as the tool box type carrier previously described.

In my invention, as illustrated in the embodiment hereafter described and shown in the drawings, I provide a tackle carrier that may be held either by a handle or by a shoulder strap and in which there are, in effect, a number of side and end compartments, each having its own door or cover such that, when the carrier is set down on its base, the fisherman is enabled rapidly to select and inspect a particular item simply by opening the door to the compartment holding the item of interest, the carrier always being held and used in an upright position. My invention also provides both horizontal tray type storage for uniform sized items, as in the tool box type carrier, as well as vertical storage for hanging hook items from the walls of the compartments. The compartment design in my carrier also lends itself to carrying small hand tools and the like in the base of the carrier.

An object of my invention is to provide an improved carrier for fishing tackle in which a number of individually accessible compartments are provided.

A further object is to provide in such a carrier a number of compartments, some of which are of a horizontal type adapted to holding weights, corks and the like, while others are of a type adapted to storing and keeping separate items such as lures, flies and the like having hooks attached.

Figure 3:
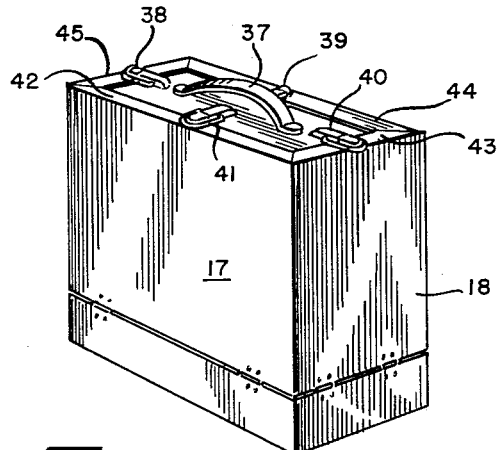
Figure 4:
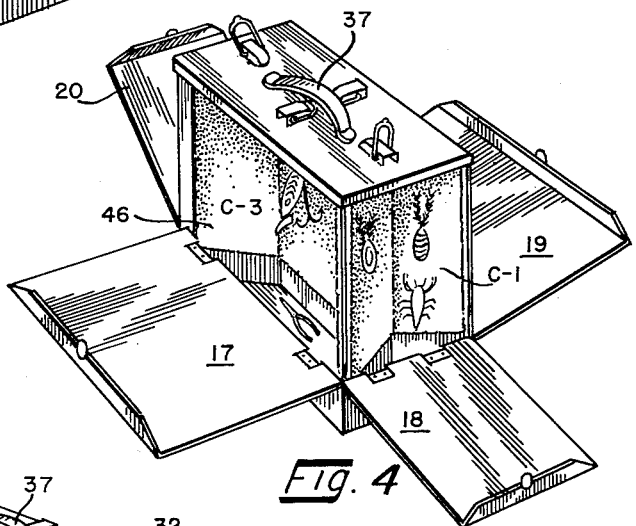
Figure 5:
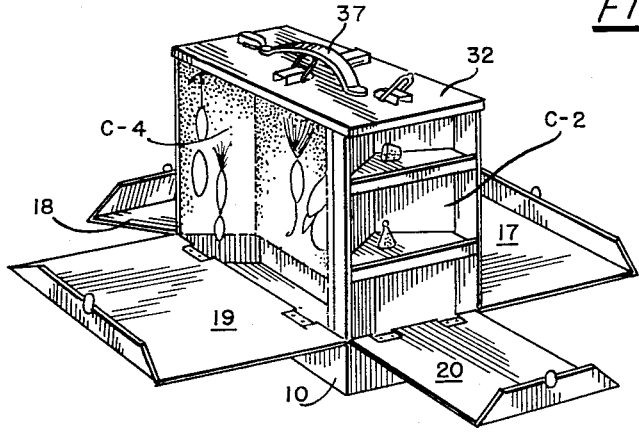

Other objects and advantages of the invention will become apparent as the description proceeds, in which:

FIGURE 1 is a perspective exploded view of the carrier;
FIGURE 2 is a plan view of the carrier's central partition;
FIGURE 2A is a plan view of an alternative central partition;
FIGURE 3 is a perspective view with all compartments closed;
FIGURE 4 is a perspective view with all compartments open;
FIGURE 5 is similar to FIGURE 4 but taken from the opposite end;
FIGURE 6 is a perspective view of an embodiment adapted for shoulder strap carry;
FIGURE 7 is a perspective view of the carrier of FIGURE 6 with all compartments open.

Referring first to FIG. 1, there is shown an exploded view of the principal components, and illustrating a preferred construction utilizing sheet metal manufacture. In this view, 10 represents a relatively shallow bottom pan formed of bent metal and having sides 11, 12, 13 and 14 which, with a bottom 15, should preferably be soldered or otherwise made into a waterproof container in order that the carrier, having pan 10 as a base, may be placed in wet locations such as on the floor of boats. Attached to each of the four sides of pan 10 by means of suitable hinges 16, are compartment covers 17, 18, 19 and 20. As will later become apparent, these covers act as doors for four separate compartments, each of which is thus given individual accessibility.

Residing within pan 10 and attached thereto by screws, solder or other suitable means, not shown, is a partitioning structure having a central partition 21 and, attached thereto, end partitions 22 and 23. Located and attached at one end of central partition 21 is end partition 24, bent so as to provide a section 25 attached to central partition 21 and, at an angle thereto, and lying substantially parallel to central partition 21, a section 26. Also attached to central partition 21 is end partition 27, having a section 28 attached to central partition 21 and, at an angle thereto and formed substantially parallel to central partition 21, a section 29.

While a wide choice is available as to the exact manner of forming sections 22, 23, 24 and 27, it is important, in order to realize fully the advantages of my invention, that the pair of sections 22 and 23 and the pair of sections 24 and 27 be so attached to central partition 21 and so separated as to allow the formation of relatively large storage space and also to promote ease of access to such space, as better understood later in the description. The somewhat triangular arrangement of sections 22, 23 and sections 24, 27 respectively, has been found practical to manufacture. However, sections 22, 23 for example, might, in effect, take the form in plan view of a semicircle or other geometric shape and still provide adequate space between said sections.

For the purpose of providing suitable horizontal type shelving to hold such articles as weights, corks and similar uniform sized items for which there is generally no problem of entanglement, there are provided shelves 30, 31 which may be soldered, spot welded or otherwise secured in place with sections 25, 26 and 28, 29 respectively, as illustrated in FIG. 1. While such shelves might be triangular or otherwise shaped and sections 25, 26 and 28, 29 formed accordingly, the particular shape of shelves 30, 31 as shown has been found simple to manufacture and practical to assemble.

As a cover for the partition structure, there is provided an inverted pan 32 of less depth but similar in construction to pan 10 and including four sides, 33, 34, 35 and 36, as shown in FIG. 1. Pan 32, like pan 10, should preferably be of watertight construction and, once formed, may be suitably secured to the partition structure by screws, soldering, welding or the like, all of which methods are well known and are not otherwise shown in detail.

For the purpose of transporting the carrier, there is provided a handle 37 suitably attached to pan 32 and, while not shown in this view, there may also be provided suitable connections for using a shoulder strap in addition to or in lieu of handle 37. However, as is later described, a slightly modified embodiment of the invention is more adaptable to shoulder strap portage.

While molded plastics, waterproof woods, metal castings or other construction methods might be used, a feature of the invention is shown in FIG. 2 in which there is illustrated a means by which the entire partition structure may be formed of one piece of metal. Assuming that a suitable length and width of metal is available, together with suitable bending equipment, sections 28 and 29 of end partition 27 may be formed with the first bend. Next, sections 25 and 26 of end partition 24 may be formed by bending the metal out and back upon itself, as illustrated in FIG. 2. Following this last bending operation, central partition 21 may be laid off and formed and, leading from this, section 23, like end partition 24, may be formed by bending the metal out and back upon itself. Finally, section 22 may be formed with the remaining metal. In this construction, it can be seen that the entire partition structure has been formed of one piece of metal and, further, that the partition structure includes two end sections of double strength, all of which leads to a strong and inexpensive manufacture.

FIG. 2A is similar to FIG. 2 and represents another method of forming the partition structure. In comparing FIGS. 2 and 1, 22' corresponds to 22, 23' to 23, 24' to 24, 27' to 27 and 21', 21", in combination, correspond to 21. In the method of FIG. 2A, I form 23', 21" and 27' of one piece of metal and form 22', 21' and 24' of a second piece of metal. Once so formed, I then join the two pieces by suitable means, such as rivets, spot welding and the like, not shown, after which the entire partition structure may be mounted between pans 10 and 32, the two pieces forming this structure being identical.

Referring next to FIG. 3, the entire carrier structure is shown in closed position, which position is maintained by means of suitable locking devces, 38, 39, 40 and 41. It will also be noticed that covers 17, 18, 19 and 20 have somewhat interlocking sections 42, 43, 44 and 45 respectively which, when closed and maintained in position by the aforesaid locking members, give the entire carrier a substantially waterproof arrangement.

With the description thus far given, the carrier can be seen to comprise a relatively few major components, namely, a bottom pan, a top pan, a central partition structure and covers hinged from said bottom pan. As further illustrated in FIG. 1, it can be seen that with top pan 32 and bottom pan 10, an end compartment C–1 is formed by end partitions 22, 23 and cover 18; an end compartment C–2 is formed by end partitions 24, 27 and cover 20; a side compartment C–3 is formed by central partition 21, end partitions 27 and 23 and cover 17, end partition 23 being common to compartments C–1 and C–3 and end partition 27 being common to compartments C–2 and C–3. Finally, a side compartment C–4 is formed by central partition 21, end partitions 22 and 24 and cover 19, end partition 24 being common to compartments C–2 and C–4, end partition 22 being common to compartments C–1 and C–4 and central partition 21 being common to compartments C–3 and C–4. With the provision of horizontal shelves 30 and 31 in compartment C–2 and the utilization of compartments C–1, C–3 and C–4 as vertical type compartments for hanging items having hooks and leaders, as later explained in more detail, my carrier thus provides both horizontal and vertical type storage compartments with separate access to each such compartment. Further, since the carrier is transported and used in an upright position, there is no tendency to jostle, tumble or otherwise disturb the stored items due to turning the carrier in various positions while carrying or removing items.

It should be noticed that the amount of horizontal and vertical storage may be varied by adding or removing shelves in the various compartments, such arrangements being dictated by the needs of the individual fisherman.

Referring now to FIG. 4, the carrier is shown with the various compartments open and in which two of the compartments, C–1 and C–3, are utilized as compartments for hanging vertically items having hooks and, for this purpose, are shown lined with a suitable resilient material 46, which may be cork, foam rubber or the like, whereby tackle items such as lures and flies having hooks attached thereto, may be positioned by embedding the hooks in said material. It will be noticed that, by means of the vertical compartments C–1 and C–3, a relatively wide expanse of area is provided for hanging vertically, without risk of entanglement, such items as flies, lures and the like having hooks attached. Compartment C–3 may, in addition, hold in the bottom pan 10 small tool items such as a pair of fisherman's pliers as represented in FIG. 4.

I have found that, by lining the relatively wide storage areas available in the compartments C–1 and C–3 with sheets of cork or the like, tackle items having hooks can be quickly stored and also easily removed and that such items will not ordinarily become entangled since they hang vertically and it is not necessary to turn the carrier over on the side or otherwise in order to gain access to the various compartments. In addition to acting as a medium into which hooks can be embedded, the cork lining serves to protect the hook points from damage and rust and also serves the important purpose of muffling noise that might arise from within the carrier and disturb the fish.

In FIG. 5, side compartment C–4 is shown arranged for vertical storage and for this purpose is also lined with resilient material. With such arrangement as shown in FIG. 5, additional provision is made in compartment C–4 for hanging vertically by their hooks, flies, lures and the like; whereas compartment C–2 with the shelving arrangement shown, provides a means for storing articles of more uniform size, such as weights, corks and the like.

FIGS. 6 and 7 relate to a further embodiment of my invention particularly adapted to a carrier designed for being supported by a shoulder strap. In this embodiment pan side 13' and cover 17' designate parts corresponding to pan side 13 and cover 17 in FIG. 1, except that 13' and 17' are formed in a substantially curved arrangement, generally corresponding to the average curvature of the body against which this side of the carrier might rest during transit. I have found that, where a shoulder strap is used, even a slight curvature of this kind makes the carrier much more comfortable to transport and such curvature also facilitates keeping the carrier in position against the body. Other than the presence of the curvature in members 13' and 17', it can be seen that FIG. 6 presents the same general overall appearance as that presented in FIG. 3.

Referring next to FIG. 7, which also refers to the second embodiment of my invention, the top pan, designated here as 32', has a somewhat curved edge 47 in lieu of side 33 (FIG. 1) and corresponding in curvature to the curvature selected for members 13' and 17'. FIG. 7 is otherwise similar to the arrangement shown in FIG. 4 in which compartments C–1 and C–3 are preferably lined with suitable resilient material for holding the hooks attached to lures, flies and the like.

Referring back to FIG. 2, I have shown in dotted line how the resilient material 46 conforms to the partition structure and it will be noticed that, unlike the old bookcase type of construction having only two side compartments separated by a common partition and in which the corners are all at right angles, I have no sharp corners as such. For example, it will be noticed that the resilient material 46 follows a relatively smooth line over central partition 21 and end partition 22. Tackle items having hooks may be positioned directly over the intersection of central partition 21 and end partition 22 in compartments C-3 and C-4, which would be impractical were this intersection a right angled corner as is found at the sides of bookcase type fly cases and the like.

I claim:

1. A fishing tackle carrier comprising, in combination, an upright rectangular base pan having side and bottom walls; an inverted rectangular top pan spaced above and opposite said base pan and having side and top walls; a vertical partition located along the major axis of said top and base pans, said partition including a central wall of length less than the length of said pans and a pair of extensions at each end of said central wall extending at an angle thereto, each of said extensions terminating at the adjacent corner of said pans; said partition being joined to each of said pans thereby making said pans and partition movable as an integral unit; doors individually and independently hinged to each of said base pan side walls and opening outwardly and downwardly from vertical closed positions, said independent hinging of said doors thereby making the opening of each door independent of the position of the other doors.

2. A fishing tackle carrier as claimed in claim 1 in which portions of the vertical surfaces of said partition are lined with hook retaining resilient material.

References Cited in the file of this patent

UNITED STATES PATENTS

| | | |
|---|---|---|
| D. 155,246 | Von Miklos | Sept. 13, 1949 |
| 1,280,430 | Ensey | Oct. 1, 1918 |
| 1,592,443 | Comstock | July 13, 1926 |
| 2,558,124 | Burden | June 26, 1951 |
| 2,608,459 | Malmquist | Aug. 26, 1952 |